UNITED STATES PATENT OFFICE.

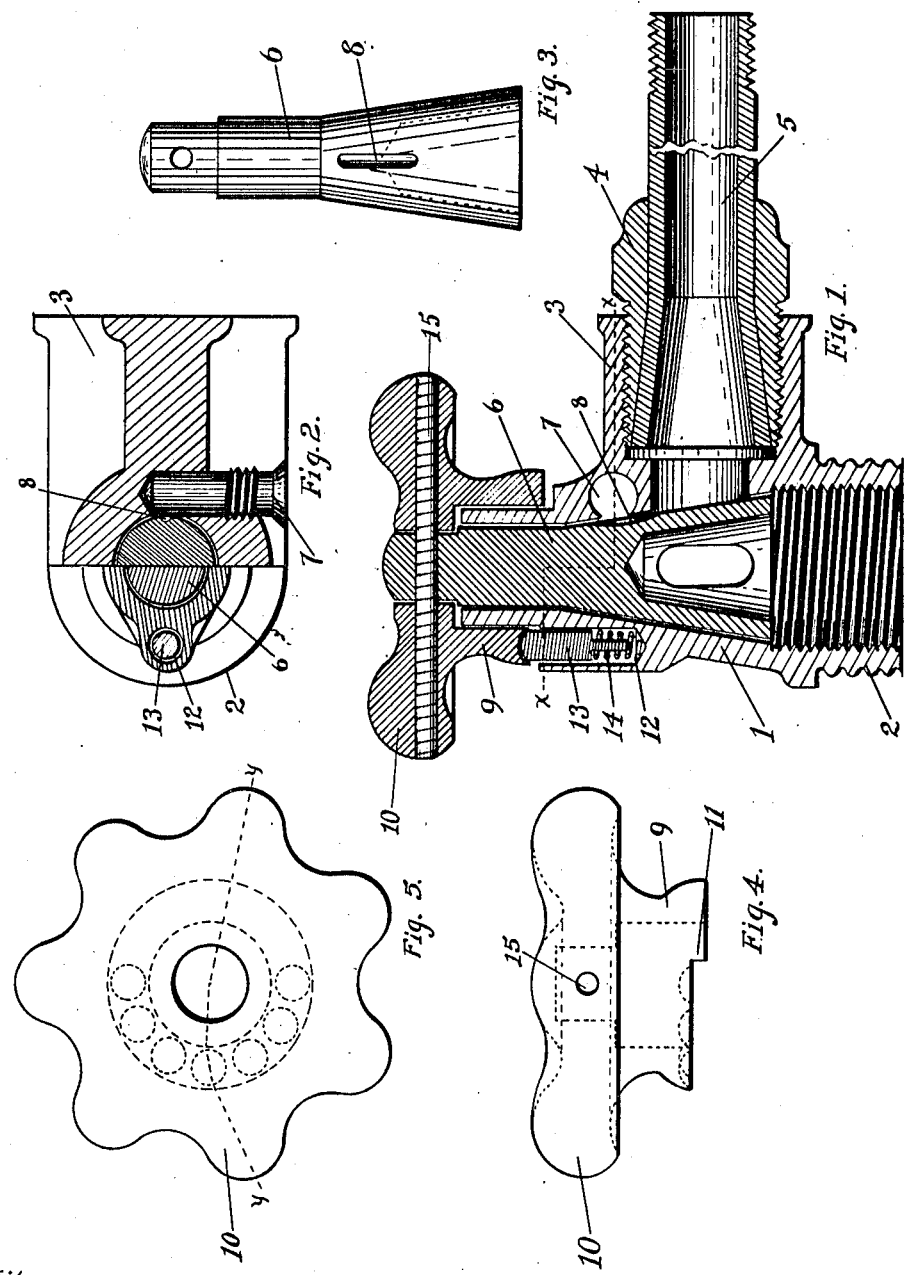

THEODORE R. SUNDBERG, OF SALT LAKE CITY, UTAH, ASSIGNOR OF ONE-HALF TO LOUIS S. CATES, OF BINGHAM CANYON, UTAH.

VALVE.

947,463.   Specification of Letters Patent.   Patented Jan. 25, 1910.

Application filed May 5, 1909. Serial No. 494,138.

*To all whom it may concern:*

Be it known that I, THEODORE R. SUNDBERG, a citizen of the United States, residing at Salt Lake City, in the county of Salt Lake and State of Utah, have invented certain new and useful Improvements in Valves, of which the following is a specification.

The object of my invention is to provide a valve to control compressed air, and particularly air used in an air drill, which will permit the drill to be operated in a smaller chamber, and in all corners and angles thereof, and one that will enable the operator to use the air to clear the valve and drill of all dust, prior to oiling the drill, and one that will not change its position, as to the air passing through it, by the vibration or jar of the drill. These objects I attain by the device illustrated in the accompanying drawings in which similar figures of reference indicate like parts throughout.

Figure 1 is a vertical section. Fig. 2 is a horizontal section on line x, x, Fig. 1. Fig. 3 is an elevation of the valve stem with air passages dotted in. Fig. 4 is an elevation of the hand wheel and standard. Fig. 5 is a plan of the hand wheel with the detent seats dotted in.

The casing 1, has an interior cavity a part of which is formed tapering toward the top, within which tapering part is fitted the valve, and said casing has an inner and outer threaded lower projection 2, that forms the inlet port. At right angles to the direction of this projection and port, on the side of said casing 1, is provided the outlet port 3, which is internally threaded. Within which port 3 is screwed a bushing 4, with a part of the opening therein bored tapering with smaller end toward its outlet. Within which bushing 4 is provided a swivel nipple 5, which is so constructed on one portion, as to conform with the taper-bored part of the said bushing 4, and ground or turned to form an air tight joint between the said bushing 4 and said nipple. The purpose being that when air under pressure is passing through them that the pressure will insure an air tight joint, yet allow rotation.
The other end of the nipple 5 is threaded to be screwed into the drill.

Within the casing 1, is fitted a valve stem 6, conforming to the vertical interior of casing 1 so as to form an air tight joint therebetween, the lower portion of said valve is chambered out to connect with a transverse horizontal passage way that is provided therethrough. This horizontal passage way in the valve is in alinement with the outlet port 3 of casing 1, when turned adjacent thereto.

Within the wall of the casing 1 and over the outlet port 3 is drilled an oil hole 7 transverse in direction to the outlet port 3. This oil hole is drilled so near the interior of casing 1 as to connect therewith, or that a connection may be made therebetween. And on the side of the valve stem 6, is cut an oil slot 8, slightly longer than the distance from the oil hole 7, to the outlet port 3. When said stem 6 is so turned, that the oil slot 8 is adjacent to the oil hole 7, the oil will flow through said oil slot into and through the outlet port 3, and into the drill. The upper portion of said casing 1 is formed to make a bearing for the standard 9 of the hand wheel 10. A portion of the lower end of said standard 9 is extended forming a lug 11, and within the portion not extended is cut hemispherically shaped detent seats. On the side of this casing 1 is a detent holder 12, within which is placed a detent 13, and a spiral spring 14. The spring will hold the upper end of the detent, within the seats that are provided in the said standard 9. When the hand wheel 10 is turned in either direction far enough, the lug 11 contacts with the said detent holder 12.

The valve stem 6 is fastened to the hand wheel 10 by the transverse pin 15; and when the valve stem 6 is held in contact with the tapering part of the interior of the casing 1, by the air pressure on the lower portion of said stem, the bottom of the standard 9 is not in contact with the top of said casing 1. The operator may, by a blow or other means, applied on the top of the hand wheel 10, force the valve stem 6, a short distance downward and the valve away from the tapering interior walls of the casing, which will allow said compressed air to partially exhaust through the oil hole 7, and clear it of any dust or other matter. Oil then applied to the drill through said hole will not carry any dust or other matter into it, that will injure the drill.

In use the device is connected to the drill by screwing the threaded end of the swivel nipple 5 into the drill; and connecting an air hose to the threaded projection 2, either by the inner or outer threads thereon. The spring on the detent and the form of the other end thereof, and the hemispherically shaped seats therefor, allow the hand wheel, with its attached valve stem, to be turned until the lug 11, contacts with the detent holder 12. Compressed air being then supplied through the inlet port 3, the valve may be rotated to either allow the air to enter the drill, or to cut it off. When turned to allow the desired amount of air to pass through the valve, the detent will engage in one of the seats and retain it in that position as long as desired, the vibration or jar of the drill when in use not being sufficient to rotate the valve stem, when so held. The swivel nipple 5 and the angled air passages through the valve will permit the drill to be operated in closer and smaller corners than is usual.

Having thus described my device, I desire to secure by Letters Patent, and claim—

1. In combination with a casing having an inner and outer threaded inlet port, a threaded outlet port at right angles thereto, a bushing for said outlet port threaded to engage the threads thereof, having a part of its inner walls formed tapering, a swivel nipple having a portion thereof tapered to peripherically contact with the taper part of said bushing; with a valve having its lower portion hollowed out, a passage way through said valve transversely cutting said hollowed part, and a hand wheel whose standard is pivotally mounted on the upper portion of said casing, detent seats formed in the bottom of said standard, a spring controlled detent mounted in said casing adapted to engage with the seats in the standard of said hand wheel, as and for the purposes described.

2. The combination of a casing having a frusto-conically shaped interior, an outlet port from said interior, a bushing for said port whose interior is conically shaped, a nipple fitted to contact with the said conically shaped interior of said bushing, a detent holder in the wall of said casing on one side of an oil passage connected with said interior on the other side, with a valve having a hollow interior and an oil slot cut in its periphery, and a transverse passage way intercepting said hollowed interior, means for rotating said valve; and a spring controlled detent adapted to hold said valve in place when not being rotated.

3. In a device of the class described, a valve having its lower portion hollowed out, a passage way through said valve transversely cutting said hollowed part, a hand wheel whose standard is pivotally mounted on a casing for said valve, detent seats formed in the bottom of said standard, a spring controlled detent mounted in said casing adapted to engage with the said seats, as and for the purposes described.

In testimony whereof I have affixed my signature in presence of two witnesses.

THEODORE R. SUNDBERG.

Witnesses:
 JAMES H. WORRALL,
 J. M. THOMAS.